Patented Apr. 23, 1946

2,399,026

UNITED STATES PATENT OFFICE 2,399,026

AMIDES OF 2-AMINOARYLENETHIAZOLES

Ernst Henzi, Basel, Switzerland, assignor to Society of Chemical Industry in Basle, Basel, Switzerland No Drawing. Application January 26, 1942, Serial No. 428,319. In Switzerland February 6, 1941

6 Claims. (Cl. 260—305)

It has been found that new amides are obtained if 2-aminoarylenethiazols are allowed to react upon aromatic hydroxycarboxylic acids which couple with diazo compounds in the ortho position to the OH-group. This reaction can take place according to known methods, such as by condensing the halides of the acids concerned with the 2-aminoarylenethiazols. Amides of the new type are also obtained when the acids concerned are heated with the arylenethiazols in question and dehydrating agents, such as phosphorous trichloride or phosphorus oxychloride, in the presence of suitable diluents, which, if desired, can also act as acid-binding agents. Toluene, chlorobenzene, dimethylaniline, pyridine, etc. are examples of such diluents.

Among the hydroxycarboxylic acids which come into question for the manufacture of the new amides mention may be made pre-eminently of ortho-hydroxycarboxylic acids, such as paracresotinic acid, 5- or 4-chloro, -4- or 5-methyl-1-hydroxybenzene - 2 - carboxylic acids, 4:5 - dimethyl-1-hydroxybenzene-2-carboxylic acid, 2-hydroxynaphthalene - 3 - carboxylic acid, 2 - hydroxynaphthalene-6-phenylamino - 3 - carboxylic acid, 2-hydroxynaphthalene - 6 - bromo - 3 - carboxylic acid, 2-hydroxyanthracene-3-carboxylic acid, etc. In the term "aromatic hydroxycarboxylic acids" are included also heterocyclic hydroxycarboxylic acids in which the OH-group is aromatically combined, such as 2- or 3-hydroxydiphenyleneoxide-3- or -2-carboxylic acid, 2-hydroxycarbazole-3-carboxylic acid, 9-methyl-2-hydroxycarbazole-3-carboxylic acid, 5-hydroxy-α-naphthocarbazole-6-carboxylic acid

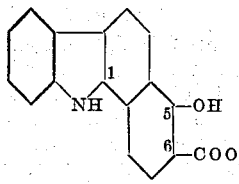

7-hydroxy-α-naphthocarbazole-6-carboxylic acid

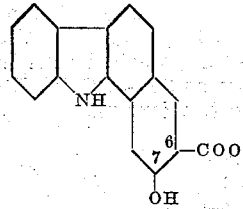

3' - methyl - 7 - hydroxy- α -naphthocarbazole-6-carboxylic acid

Among the 2-aminoarylenethiazols, which can also be used in the preparation of the new amides, mention may be made of 2-aminobenzthiazol, 2-amino-6-methoxy- or -6-ethoxybenzthiazol, 2-amino-6-chloro - benzthiazol, 2-amino-4-methylbenzthiazol, 2-amino-4-methyl-6-chlorobenzthiazol, 2-amino-6-methylbenzthiazol, 2-amino-6:7-benzobenzthiazol, 2 - amino - 2'- methoxy - 6:7-benzobenzthiazol, as well as diamino-dithiazols, which can then be combined with 2 molecules of the hydroxycarboxylic acid. Such diamino-dithiazols are obtained, for example, by condensation of 2 molecules of thiocyanic acid with 1 molecule of the corresponding diamine, such as benzidine or 4:4'-diaminodiphenylene oxide.

The new amides thus correspond to the general formula $$\left[ \begin{array}{c} \text{OH} \\ | \\ \text{R—C—N—C} \\ \phantom{\text{R—}} \| \phantom{\text{—}} | \phantom{\text{—}} \diagdown \\ \phantom{\text{R—C—}} \text{O} \phantom{\text{—}} \text{H} \phantom{\text{—}} \text{N—} \end{array} \begin{array}{c} \text{S—} \\ \diagup \\ \\ \end{array} \text{R}_1 \right]_x$$

in which R stands for an aromatic radical in which the OH-group is united in such a manner that diazo compounds react with this aromatic radical with formation of ortho-hydroxyazo dyestuffs. Furthermore, in the above general formula, $x$ denotes a whole number not less than one and not greater than two, and $R_1$ denotes an aromatic radical to which the sulphur atom and the nitrogen atom of the atom grouping $$-\text{C} \diagup\!\!\!\diagdown \begin{array}{c} \text{S—} \\ \text{N—} \end{array}$$

are united in the ortho position to one another. Both radicals, R and $R_1$ can belong to the most varied aromatic series, for example, to the benzene series, the naphthalene series, the anthracene series, the diphenyl series, the diphenylmethane series, etc. Furthermore, in this respect, reference is made to the second paragraph of the specification. These varied possibilities are illustrated below by a series of special cases. Those amides are especially valuable in which the OH-group stands in the ortho position to the $$-\text{C—NH} \\ \phantom{-}\|\phantom{-} \\ \phantom{-}\text{O}$$

group and, among these, those in which the

group corresponds to the atomic grouping of 2-hydroxynaphthoic acid and its pure substitution products which are capable of coupling.

Thanks to the presence of the OH-group, the new amides possess the property of forming water-soluble alkali salts, as well as that of uniting with diazo compounds to yield azo-dyestuffs. In the form of their solutions in caustic alkalis they possess a pronounced affinity for vegetable fibres, so that they can be used with success for the preparation of dyeings on the most varied textile materials, such as cotton, regenerated cellulose, natural silk, wool, ramie, etc., by the methods in common use for the production of ice colours.

Quite generally, the diazotizable bases which are mentioned in the pertinent literature and patents in the field of ice colours can be used as diazo components for the preparation of the new dyestuffs. Such bases are, for example, the chloranilines, such as 2:5- or 2:4-dichloraniline, the chlorotoluidines, such as 1-amino-2-methyl-4- or -5- or -6-chlorobenzene, nitranilines, such as 1-amino-2-nitro- or 1-amino-2-nitro-4-chlorobenzene, 1-amino-2-nitro-4-methylbenzene, 1-amino-2-methyl-4- or -5-nitrobenzene, as well as phenol ethers, such as 1-amino-2-methoxy-4-chlorobenzene, 1-amino-2-methoxy-4- or -5-nitrobenzene, 2-amino-4- chlorodiphenylether, 2-amino-4':4'-dichlorodiphenylether, 2-amino-2':4:-dichlorodiphenylether, 2 - amino-2':4':4-trichlorodiphenylether, 2-amino-2'- or -3'- or -4'-methly-4-chlorodiphenylether, 2 - amino-4-chlorobenzene-1-benzyl ether, 4-amino-4'-methoxydiphenylamine, 4-amino-2:5-dimethoxy- or 2:5-diethoxy - 1 - benzoylaminobenzene, 1 - amino-2:5-dimethoxy- or 2:5-diethoxy-1-(2'- or 4'-methyl)-phenoxyacetylaminobenzene, 4 - amino - 2:5 - diethoxy- or 2:5-dimethoxy-1-carbethoxyaminobenzene, benzidine, dianisidine, α-naphthylamine, etc., furthermore, amino-azo dyestuffs, such as 4-aminoazobenzene, 4-amino-2-methoxyazobenzene, 4-amino-3:2'-dimethylazobenzene, 4-amino - 4' - methylazobenzene, 4-amino-4'-nitroazobenzene, 4 - amino-2'-chloro-4'-nitroazobenzene, 4-amino - 2:5 - dimethoxy-4'-nitroazobenzene, 4-amino-2:5-diethoxy-4'-nitroazobenzene, 4-amino-2:5-dimethoxy-2'-chloro-4' - nitroazobenzene, 4 - amino-3-methoxy-4'-nitroazobenzene, 4-amino - 3 - methoxy - 6 - methyl-4'-nitroazobenzene, 4:4'-diaminoazobenzene, 4:4'-diamino - 3 - methoxy-6-methylazobenzene, 4-aminonaphthalene-1-azobenzene, 4:4'-diaminonaphthalene-1-azobenzene, 4-amino-naphthalene-2'-methoxy - 1 - azobenzene, etc.

Among these dyestuffs those are especially valuable which are derived from diazo components of the group of phenol ethers, particularly of the phenyl and benzyl ethers of orthoaminophenol and of the group of the aminoazo dyestuffs.

The new dyestuffs thus correspond to the general formula:

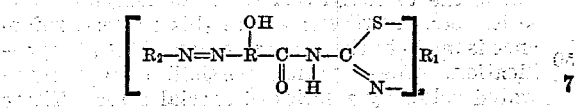

in which R, x and R₁ have the meanings already described and R₂ stands for the radical of any desired aromatic radical, for example, a radical of the benzene, naphthalene or diphenyl series.

Here also, those radicals are to be understood as aromatic radicals which consist of aromatic nuclei united together by bridges of a non-aromatic nature. Thus, for example, not only benzene and toluene radicals are to be considered as aromatic radicals of the benzene series, but also radicals of diphenylether, azobenzene, diphenylamine, benzanilide, etc.

In this case also, the above general formula will be illustrated by a number of examples which will be found below.

As already mentioned, these new dyestuffs can be prepared on the fibre itself. If they are used in printing, the diazotizing components can be used in the form of N-nitrosamines or in the form of water-soluble salts of diazoamino compounds.

The following examples illustrate the new invention, but are not to be regarded as limiting it in any way, the parts being by weight.

*Example 1*

188 parts of 2-hydroxynaphthalene-3-carboxylic acid and 194 parts of 2-amino-6-ethoxybenzthiazol are heated with 1000 parts of chlorobenzene to 75° C. 46 parts of phosphorous trichloride are dropped into this mixture in the course of 1 hour, after which the reaction mixture is heated at the boil until no more hydrochloric acid is evolved. After cooling, the precipitated condensation product is filtered off. Traces of solvent are removed with steam in the presence of an excess of sodium acetate; the condensation product is then filtered, washed with water and dried.

The chlorobenzene can be replaced by other solvents, such as toluene or dimethylaniline. Phosphorous hydroxychloride, for example, or thionyl chloride or silicon tetrachloride can be used in place of phosphorous trichloride.

The new amide corresponds to the formula

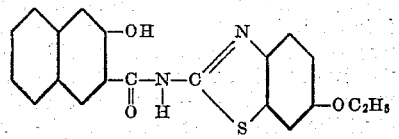

It can be converted into an alkali salt preferably by triturating with alcohol, Turkey red oil and sodium hydroxide solution of 40 per cent strength, the aqueous solutions of which possess an entirely surprising affinity for cellulose, for example vegetable fibers.

The amides from 2-amino-6-methoxybenzthiazol, 2-amino-6-chlorobenzthiazol, 2-amino-6-methylbenzthiazol, 2-amino-5-methylbenzthiazol, 2-amino-benzthiazol etc. behave similarly.

*Example 2*

206.5 parts of 2-hydroxynaphthalene-3-carboxylic acid chloride and 180 parts of 2-amino-6-methoxybenzthiazol are heated slowly to the boil with 1200 parts of chlorobenzene and are boiled for 12 hours under reflux with stirring. After cooling, the precipitated condensation product is filtered off and traces of solvent are removed with steam in the presence of so much sodium carbonate that a weakly alkaline solution is formed. The pale yellow condensation product is then filtered off, washed with hot water and dried. It melts at 300–302° C. The new amide corresponds to the formula

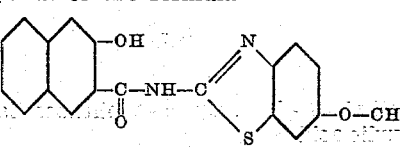

Example 3

188 parts of 2-hydroxynaphthalene-3-carboxylic acid and 180 parts of 2-amino-6-methoxybenzthiazol are heated to 70–80° C. in 1000 parts of diethylaniline. 46 parts of phosphorous trichloride are dropped into this mixture during the course of an hour, and the reaction mixture is then heated to 130–140° C. for 4 hours. After cooling, the reaction mass is introduced into an excess of hydrochloric acid whilst stirring. The precipitated condensation product is filtered off and washed with hot water. To purify it it is dissolved in dilute caustic soda by addition of alcohol and is reprecipitated by carbonic acid.

The condensation product has the same formula as the product of Example 2.

Instead of 2-hydroxynaphthalene-3-carboxylic acid, other hydroxycarboxylic acids can be used, such as 2-hydroxynaphthalene-6-phenylamino-3-carboxylic acid, 2-hydroxynaphthalene-6-bromo-3-carboxylic acid, 2-hydroxyanthracene-3-carboxylic acid, etc.

Example 4

152 parts of 1-methyl-4-hydroxybenzene-5-carboxylic acid and 194 parts of 2-amino-6-ethoxybenzthiazol are heated to 70–80° C. in 1200 parts of chlorobenzene. 69 parts of phosphorous trichloride are dropped into this mixture in the course of 1 hour, when the reaction mixture is boiled until no more hydrochloric acid is evolved. After cooling, 100 parts of sodium acetate crystals are added, and the chlorobenzene is removed by steam distillation. The new condensation product which is precipitated is filtered off, washed with hot water and dried. To purify it, it is recrystallized from boiling glacial acetic acid. It melts at 264–265° C.

The new pale yellow condensation product has the formula

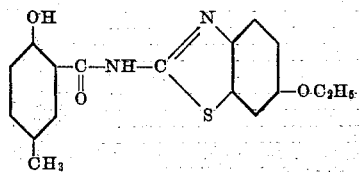

Instead of 1-methyl-4-hydroxybenzene-5-carboxylic acid, salicylic acid, xylenol carboxylic acid or 4-benzoylphenol-ortho-carboxylic acid, etc., can be used.

Example 5

226 parts of 3-hydroxydiphenylene oxide-2-carboxylic acid and 194 parts of 2-amino-6-ethoxybenzthiazol are heated to 75° C. with 1500 parts of chlorobenzene. 46 parts of phosphorous trichloride are dropped into this mixture during the course of 1 hour, when the mixture is boiled until no more hydrochloric acid is evolved. After cooling, the new condensation product is filtered off and, after addition of sufficient sodium carbonate to give a weakly alkaline solution, is freed from solvent by steam distillation. The precipitated condensation product, which possesses the formula

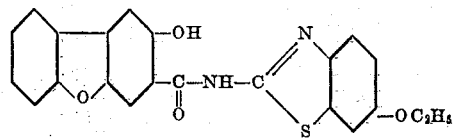

is filtered, washed with hot water and dried.

Instead of chlorobenzene, toluene or xylene can be used as diluent; dimethylaniline or diethylaniline can also be used as a basic solvent, when the condensation product can be worked up as described in Example 3.

Example 6

376 parts of 2-hydroxynaphthalene-3-carboxylic acid, 314 parts of dithiazol from 4:4'-diaminodiphenylether are heated to 75° C. in 2200 parts of chlorobenzene. 92 parts of phosphorous trichloride are dropped into this mixture in the course of 1 hour, when the mixture is boiled until no more hydrochloric acid is evolved. After cooling, the precipitated condensation product is filtered off, and the remaining solvent is removed by steam distillation in the presence of a little sodium carbonate. The precipitated product is filtered, washed with hot water and dried. For further purification, for example, it can be recrystallized from boiling pyridine. The product melts at 304° C.

The new condensation product has the formula

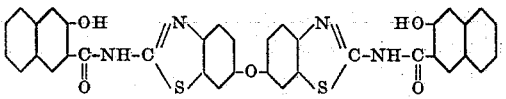

The carboxylic acid amides derived from 2-hydroxy-naphthalene-3-carboxylic acid and the dithiazol from 4:4'-diaminodiphenyl or 4:4'-diamino-3:3'-dimethyldiphenyl are prepared in a similar manner.

Further amides of the same type are obtained by combination of the hydroxycarboxylic acids mentioned in the individual examples with the aminothiazols of other examples. In this way, other amines, such as

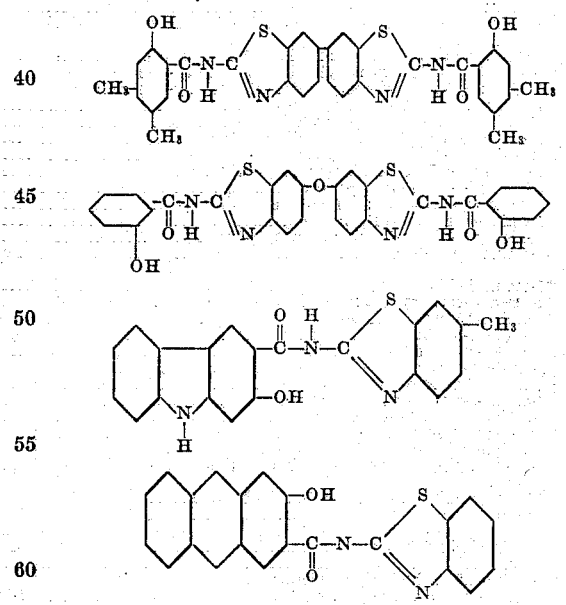

etc., are obtained.

Example 7

36.4 parts of 2-(2'-3'-hydroxynaphthoylamino)-6-ethoxybenzthiazol are converted into the sodium salt with 150 parts of ethylalcohol, 30 parts of Turkey red oil and 40 parts by volume of sodium hydroxide of 30 per cent. strength. After diluting the mixture with 300 parts of water dilute acetic acid is added until the reaction is feebly acetic. A diazo solution from 25.4 parts of 2':4-dichloro-2-aminodiphenylether which has been diazotized in known manner, is allowed to run into this fine suspension, while stirring.

When coupling is complete, the red insoluble dyestuff is filtered, washed hot and dried.

The dried dyestuff is a red powder which melts at 300° C. after recrystallization from nitrobenzene.

The procedure is similar when preparing other pigments which are obtained on the one hand from the new amides, and, on the other hand, from the diazotizing components indicated in the present introduction.

*Example 8*

Cotton yarn is impregnated with an aqueous solution containing per liter 1.5 parts of the amide from 2-hydroxynaphthalene-3-carboxylic acid and 2-amino-6-ethoxy-benzthiazol, 3 parts by volume of sodium hydroxide solution of 36° Bé. and 5 parts by volume of Turkey red oil and 3 cc. of ethyl alcohol, thoroughly wrung out and developed in a diazo solution neutralized with sodium acetate which corresponds per liter to 2 parts of 2-amino-4:4'-dichlorodiphenylether. An intensive, pure blue-red shade is obtained which has very good fastness properties.

Such arylides can be used also for printing and for piece goods dyeing.

The procedure is similar with the new amides and diazo components obtained according to the data of the present introduction. If the new amides do not possess such a pronounced affinity for the cellulose fiber, as is the case with the amides from hydroxy carboxylic acids of the benzene series, the use of more concentrated baths is recommended.

The following table contains a number of shades obtainable from diazo components as indicated in the present introduction and from amides obtainable from hydroxy-carboxylic acids and 2-aminoarylthiazols or analogues thereof as indicated in the introduction.

| | Diazo component | Coupling component: hydroxycarboxylic acid amide from— | Shade of the dyeing on cotton |
|---|---|---|---|
| 1 | 1-amino-2-nitrobenzene | 1 mol: 2-hydroxy-naphthalene-3-carboxylic acid + 2-amino-6-ethoxy-benzthiazol. | Brownish red. |
| 2 | 1-amino-3-chlorobenzene | do | Red. |
| 3 | 1-amino-2:5-dichlorobenzene | do | Brownish red. |
| 4 | 1-amino-2-methoxy-5-nitrobenzene | do | Red. |
| 5 | 4:4'-dichloro-2-amino-diphenylether | do | Bluish red. |
| 6 | 1-amino-2-methoxy-5-chlorobenzene | do | Do. |
| 7 | 1-amino-2-methoxy-4-nitrobenzene | do | Bordeaux. |
| 8 | 1-amino-2-nitro-4-chlorobenzene | do | Red. |
| 9 | 1-amino-2-methyl-4-chlorobenzene | do | Do. |
| 10 | Aminoazotoluene | do | Reddish violet. |
| 11 | 1-amino-2-chlorobenzene | do | Brownish red. |
| 12 | 1-aminobenzene-2-carboxylic acid-(4'-chloro-)-phenyl ester | do | Do. |
| 13 | 1-amino-2-methyl-3-chlorobenzene | do | Red. |
| 14 | 1-amino-2-methyl-3-nitrobenzene | do | Do. |
| 15 | 1-amino-2-methyl-5-chlorobenzene | do | Bluish red. |
| 16 | 1-amino-2-nitro-4-methylbenzene | do | Red. |
| 17 | 1-amino-2-methyl-4-nitrobenzene | do | Bordeaux. |
| 18 | 1-phenylazo-4-amino-5-methoxybenzene | do | Violet. |
| 19 | 1-amino-2-nitro-4-methoxybenzene | do | Bordeaux. |
| 20 | 4-(4'-methyl)-phenoxy-acetylamino-2:5-dimethoxy-1-aminobenzene. | do | Violet. |
| 21 | 4-benzoylamino-5-methyl-2-methoxy-1-aminobenzene | do | Reddish violet. |
| 22 | 4-(2'-methyl)-phenoxy-acetylamino-2:5-diethoxy-1-aminobenzene | do | Navy blue. |
| 23 | 4-(4'methyl)-phenoxy-acetylamino-2:5-diethoxy-1-aminobenzene | do | Reddish blue. |
| 24 | 4-benzoylamino-2:5-diethoxy-1-aminobenzene | do | Navy blue. |
| 25 | 2':4-dichloro-2-amino-diphenylether | do | Red. |
| 26 | 4'-chloro-4-carbethoxy-2-aminodiphenylether | do | Bluish red. |
| 27 | 4:4'-diamino-3:3'-dimethoxy-2:2'-dichlordiphenyl | do | Do. |
| 28 | 4'-methyl-4-chloro-2-amino-diphenylether | do | Do. |
| 29 | 2'-methyl-2-aminodiphenyl-ether | do | Red. |
| 30 | 4'-methoxy-4-chloro-2-amino-diphenylether | do | Bluish red. |
| 31 | 4-amino-4'-methoxy-dipenylamine | do | Navy blue. |
| 32 | 2'-methyl-4-chloro-2-amino-diphenylether | do | Red. |
| 33 | 1-amino-2-nitrobenzene | 2 mols: 2-hydroxynaphthalene-3-carboxylic acid + dithiazol from 4:4'-diaminodiphenylether. | Brownish orange. |
| 34 | 1-amino-3-chlorobenzene | do | Do. |
| 35 | 1-amino-2-carboxylic acid-(4'-chloro)-phenylester | do | Do. |
| 36 | 1-amino-2:5-dichlorobenzene | do | Do. |
| 37 | 1-amino-2-methoxy-5-nitrobenzene | do | Red. |
| 38 | 4-chloro-2-amino-diphenylether | do | Do. |
| 39 | 1-amino-2-methoxy-5-chlorobenzene | do | Do. |
| 40 | 1-amino-2-methoxy-4-nitrobenzene | do | Bordeaux. |
| 41 | 1-amino-2-nitro-4-methylbenzene | do | Red. |
| 42 | 1-amino-2-methyl-4-chlorobenzene | do | Do. |
| 43 | Ortho-amidoazotoluene | do | Reddish violet. |
| 44 | 1-amino-2-nitro-4-methoxybenzene | do | Bordeaux. |
| 45 | 4-(4'-methyl)-phenoxyacetylamino-2:5-dimethoxy-1-aminobenzene. | do | Reddish blue. |
| 46 | 4-benzoylamino-2:5-diethoxy-1-aminobenzene | do | Blue. |
| 47 | 1-amino-2-nitrobenzene | 1-hydroxy-4-methylbenzene-2-carboxylic acid + 1 mol: 2-amino-6-ethoxybenzthiazol. | Violet brown. |
| 48 | 1-amino-3-chlorobenzene | do | Reddish brown. |
| 49 | 1-amino-2:5-dichloroaniline | do | Do. |
| 50 | 2-amino-4:2'-dichlorodiphenylether | do | Brown. |
| 51 | 2-amino-4:4'-dichlorodiphenylether | 1-hydroxy-4-methylbenzene-2-carboxylic acid + 1 mol: 2-amino-6-ethoxybenzthiazol. | Do. |
| 52 | 2-amino-4-chlorodiphenylether | do | Do. |
| 53 | 1-amino-2-methoxy-5-chlorobenzene | do | Yellowish brown. |
| 54 | 2-amino-4'-chloro-4-carbethoxydiphenylether | do | Reddish brown. |
| 55 | 2-amino-1-methyl-5-nitrobenzene | do | Black brown. |
| 56 | 2-methoxy-phenylazo-4'-amino-3'-methylbenzene | do | Do. |
| 57 | 1-amino-2-nitro-4-methoxybenzene | do | Reddish brown. |
| 58 | 1-amino-2-nitrobenzene | 2 mols: 2-hydroxynaphthalene-3-carboxylic acid + 1 mol: 2: 2'-diamino-6: 6'-diphenyldithiazol. | Red. |
| 59 | 1-amino-3-chlorobenzene | do | Do. |
| 60 | 1-amino-2; 5-dichloroaniline | do | Do. |
| 61 | 2-amino-4: 2'-dichlorodiphenylether | do | Do. |
| 62 | 2-amino-4: 4'-dichlorodiphenylether | do | Do. |
| 63 | 2-amino-4-chlorodiphenylether | do | Do. |
| 64 | 1-amino-2-methoxy-5-chlorobenzene | do | Bluish red. |
| 65 | 2-amino-4'-chloro-4-carbethoxydiphenylether | do | Red. |
| 66 | 2-amino-1-methyl-5-nitrobenzene | do | Bluish red. |
| 67 | 2-methoxyphenylazo-4'-amino-3-methylbenzene | do | Bordeaux. |
| 68 | 1-amino-2-nitro-4-methoxybenzene | do | Do. |
| 69 | 4-benzoylamino-2: 5-diethoxyaminobenzene | do | Bluish black. |

The dyestuffs of the numbers 2, 5, 10, 18, 20, 24, 25, 28, 43, 50, 56, 61 and 69 of the foregoing table correspond to the following formulas:
No. 2
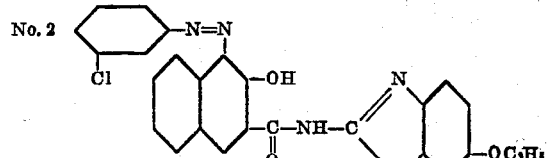
No. 5
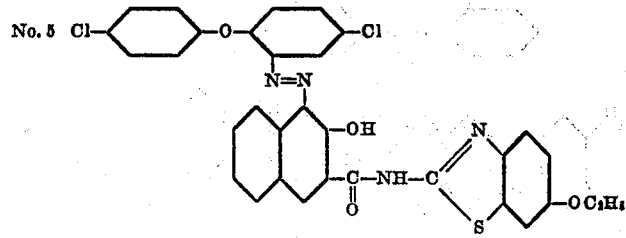
No. 10
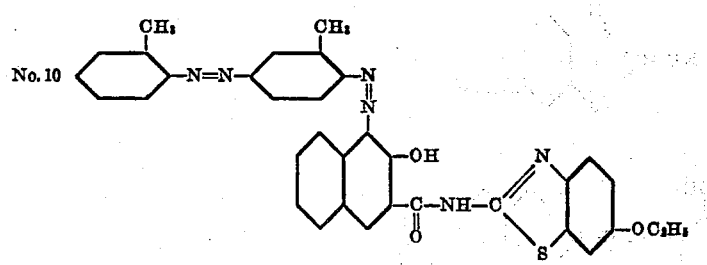
No. 18
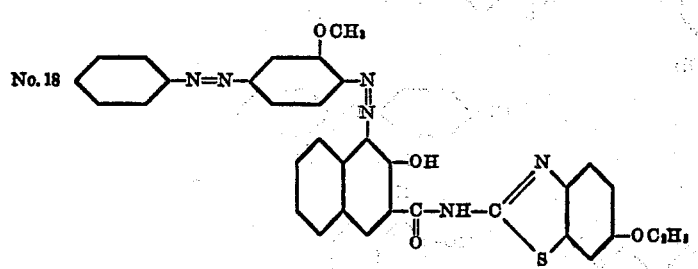
No. 20
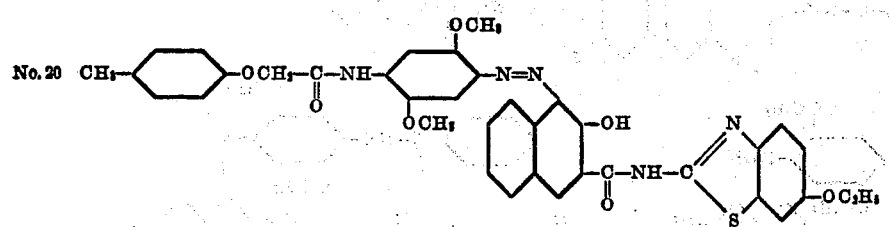
No. 24
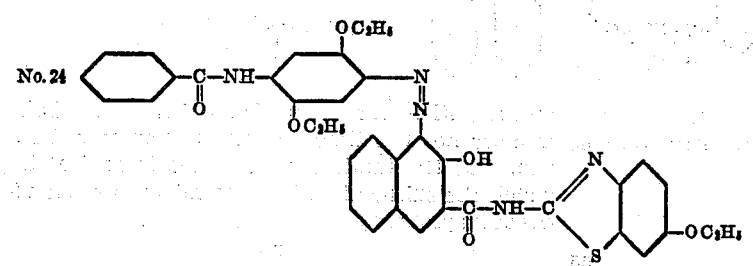
No. 25
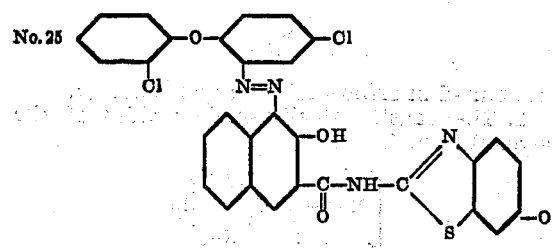

No. 28 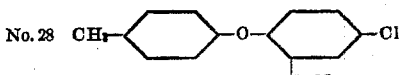
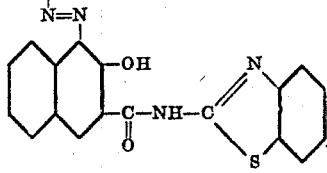

No. 43 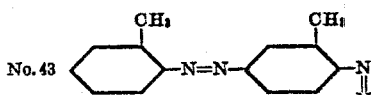 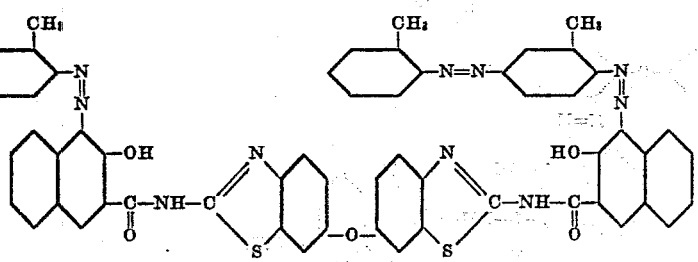

No. 50 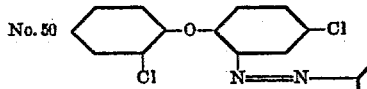
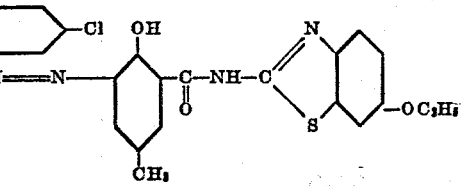

No. 56 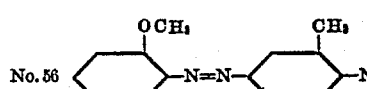
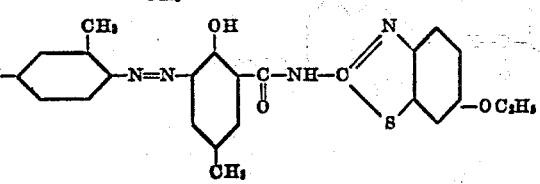

No. 61 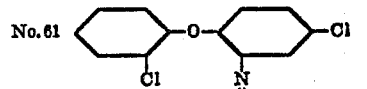 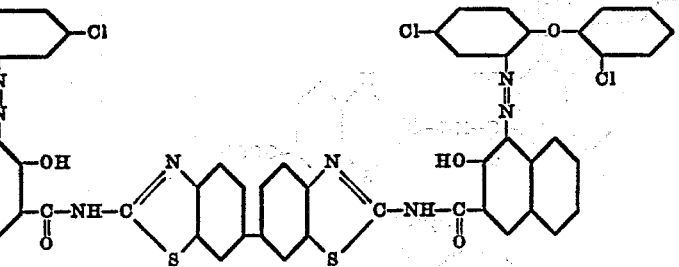

No. 69 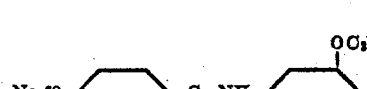 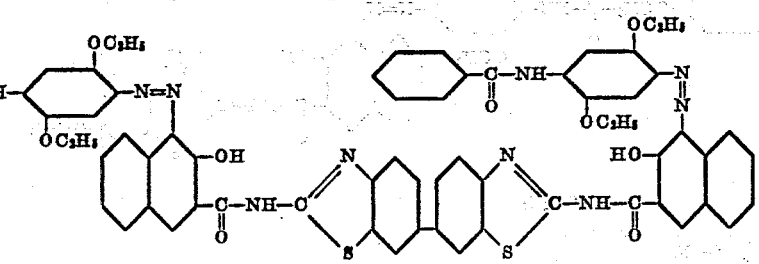

What I claim is:
1. The caustic alkali-soluble amides of the formula

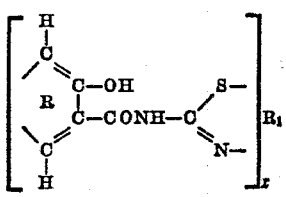

wherein R stands for an aromatic radical selected from the group consisting of a benzene nucleus containing a methyl group in para-position to the OH group, a benzene nucleus containing a chlorine atom in para-position to the OH group, and naphthalene, carbazole, diphenylene oxide and naphthocarbazole nuclei, $x$ denotes a whole number not less than one and not greater than two, and $R_1$ stands for an aromatic radical to which the sulfur atom and the nitrogen atom of the atom grouping

are united in ortho-position to one another.

2. The caustic alkali-soluble amides of the general formula

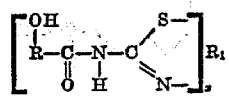

in which R stands for the radical of a 2-hydroxy-naphthalene-3-carboxylic acid compound, $x$ denotes a whole number not less than one and not greater than two, and $R_1$ stands for an aromatic radical to which the sulfur atom and the nitrogen atom of the atom grouping

are united in the ortho-position to one another.

3. The amides of the general formula

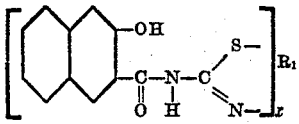

in which $x$ denotes a whole number not less than one and not greater than two, and $R_1$ stands for an aromatic radical to which the sulfur atom and the nitrogen atom of the atom grouping

are united in the ortho-position to one another.

4. The amides of the general formula

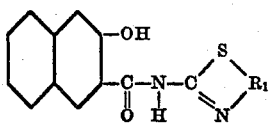

in which $R_1$ stands for an aromatic radical to which the sulfur atom and the nitrogen atom of the atom grouping

are united in the ortho-position to one another.

5. The amides of the general formula

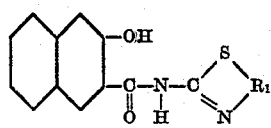

in which $R_1$ stands for an aromatic radical of the benzene series to which the sulfur atom and the nitrogen atom of the atom grouping

are united in the ortho-position to one another.

6. The amides of the general formula

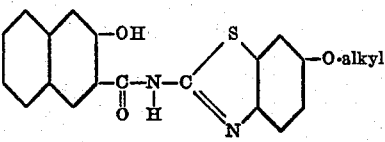

in which the alkyl radical does not consist of more than 2 carbon atoms.

ERNST HENZI.